UNITED STATES PATENT OFFICE.

CHARLES E. BAKER, OF CHICAGO, ILLINOIS.

METHOD OF RECOVERING ZINC AND IRON FROM SOLUTIONS THEREOF.

1,224,057. Specification of Letters Patent. Patented Apr. 24, 1917.

No Drawing. Application filed January 26, 1917. Serial No. 144,625.

*To all whom it may concern:*

Be it known that I, CHARLES E. BAKER, a citizen of the United States, residing at Chicago, in the county of Cook and State of Illinois, have invented certain new and useful Improvements in Methods of Recovering Zinc and Iron from Solutions Thereof, of which the following is a specification.

This invention is a novel method for recovering zinc and iron from solutions containing these metals, for example as chlorids or sulfates. Such solutions are formed as a product of various metallurgical operations, such as the pickling of galvanized scrap, the treatment of ores and other metallurgical products with acid solvents or ferric salt solutions, etc.

Assuming the solution to contain iron and zinc as chlorids or sulfates, and to be free from less electropositive metals, the solution is electrolyzed, using an insoluble anode, and preferably a cell in which the electrodes are separated by a porous partition or diaphragm. For example, in case of chlorid solutions, the anode may be of graphite, while the cathode may take the form of a plate or sheet of iron or other metal. Iron and zinc are simultaneously deposited at the cathode, while the chlorin which is liberated at the anode may be collected for use. It is not essential or important that the conditions of electrolysis should be controlled to produce a dense and compact deposit of the metals; and in fact the subsequent step of the process may be carried out more easily and favorably when the cathode deposit is of a somewhat loose and open, or even spongy texture, although it should preferably be sufficiently compact to permit it to be handled *in situ* on the cathode plates.

When the electrodeposition has proceeded far enough, the cathode deposit is washed if desired, dried, and thereafter heated in a closed furnace or chamber to a temperature sufficient to volatilize or distil all or nearly all of the zinc, leaving the iron. The zinc may be condensed as metal, or if desired the zinc vapors may be oxidized by admission of air as is well understood in the art, the resulting zinc oxid being collected by means of bags or other suitable means.

In case the solutions contain in addition to the iron and zinc such relatively electronegative metals as copper, lead, silver, gold, etc., these are preferably first precipitated by any suitable method, for example by a preliminary electrolytic treatment of the solution in a cell of the same type as mentioned above. The deposition of the iron and zinc and their subsequent separation can then be carried out as already described.

The simultaneous deposition of the zinc and iron proceeds easily and permits a wide range of conditions. Thus the electrolysis may proceed at normal or higher temperatures, a potential difference of about three and one-half volts, more or less, being suitable. It is preferred to circulate the electrolyte, or to rotate one or both of the electrodes, during the electrodeposition, although this is not necessary.

I claim:—

1. A method of recovering zinc and iron from solutions containing the same, consisting in simultaneously depositing the said metals, and then effecting a separation thereof by vaporizing the zinc, and recovering the zinc.

2. A method of recovering zinc and iron from solutions containing the same, consisting in simultaneously precipitating the said metals in the form of a non-compact deposit, then effecting a separation of the metals by vaporizing the zinc, and recovering the zinc.

CHARLES E. BAKER.